UNITED STATES PATENT OFFICE.

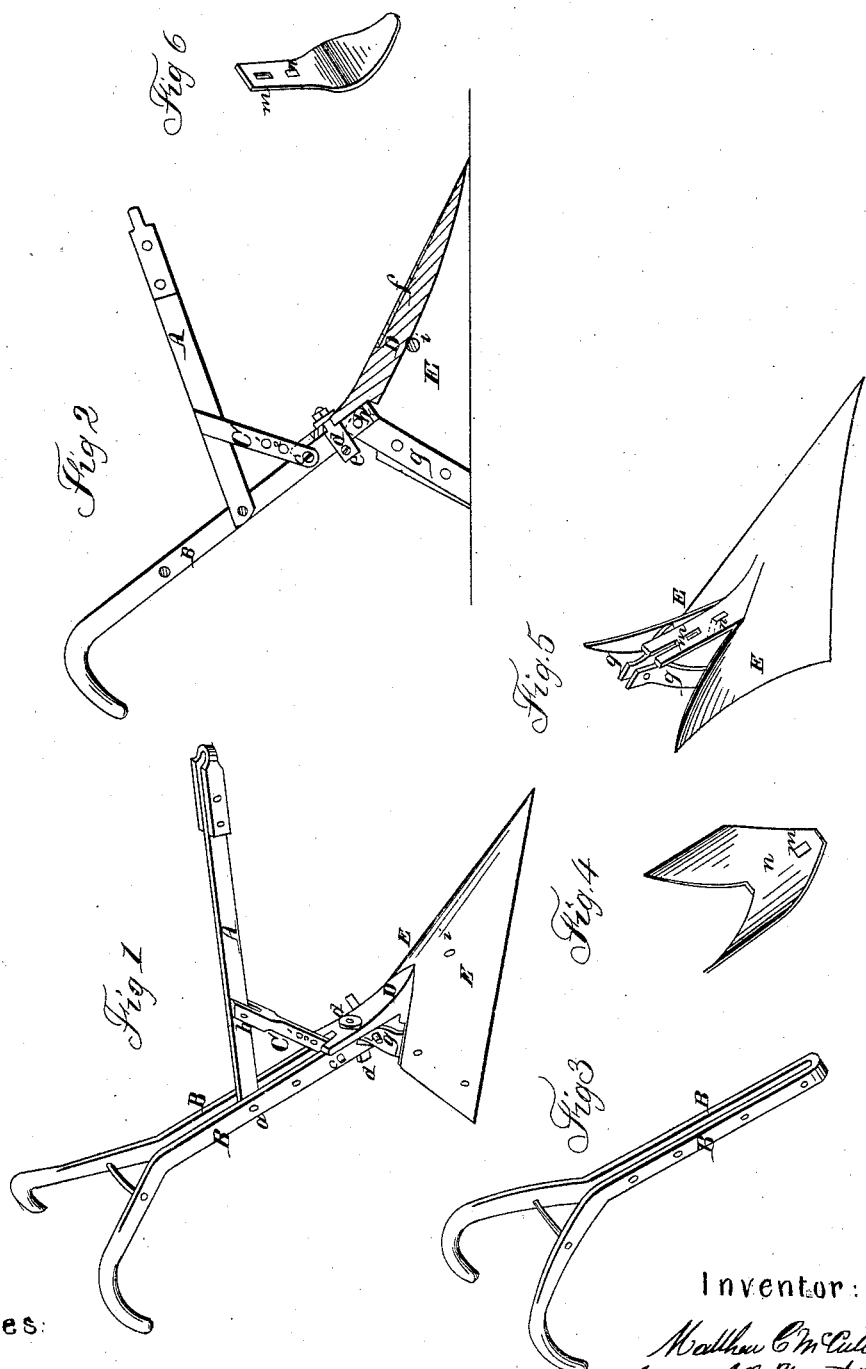

MATTHEW C. McCULLERS, OF HERNDON, GEORGIA.

IMPROVEMENT IN PLOWS.

Specification forming part of Letters Patent No. 28,000, dated April 24, 1860.

*To all whom it may concern:*

Be it known that I, MATTHEW C. McCULLERS, of Herndon, in the county of Burke and State of Georgia, have invented certain new and useful Improvements in Plows; and I do hereby declare the following to be a full, clear, and exact description of the same, reference being had to the accompanying drawings, making a part of this specification, in which—

Figure 1 represents the plow in perspective in one of its forms. Fig. 2 represents the same plow with the share and one side of the double mold-board removed, which leaves it in section and shows how it may be made a subsoiler. Figs. 3, 4, 5, and 6 represent detached parts that may be used in connection with my plow-stock, as will be hereinafter described.

Similar letters of reference, where they occur in the several figures, denote like parts in all of them.

To enable others skilled in the art to make and use my invention, I will proceed to describe the same with reference to the drawings.

A represents the plow-beam, which, like all the other parts of the plow, may be made of iron; but I do not confine myself exclusively to this material, but simply prefer it, for wood may be used for some of the parts of the plow.

B are the plow-handles. They may be made as shown at Fig. 3 and connected to the rear of the beam by a bolt, $a$.

C is a brace for bracing the beam and handles together. The top of this brace can swing on its bolt $b$, and its lower end has a series of adjusting-holes, 1 2, &c., in it, through one of which and through the handles B passes a bolt, $c$. The object of the adjustment is to set the beam higher or lower, to adapt the plow for deeper or more shallow plowing, as may be desired.

To the lower end of the handles B is connected a stock, D, the form of which may be seen in Fig. 2. The upper end of this stock D is notched, so as to straddle the brace $c$, and a broad-headed flat bolt, $d$, passes through it and between the handles B, with a pin, $e$, or other fastening to hold said stock and handles firmly together.

The plows proper, E, are what I term the "center-share double-furrow" plow, the line $f$ being the share and E the mold-boards. $g$ $g$ are braces, which brace and hold the heels of the mold-board to the handles, as at $h$. There is a pin or bolt, I, passing through both mold-boards, and when the stock D is slipped under the comb or angle of the mold-board and above this pin $i$ it secures the two rigidly together. By removing the pin or bolt $h$ the mold-boards E can be removed, and the stock D alone may be used as a subsoiler, it having a long narrow form that adapts it to this purpose; or another form of mold-board may be substituted for them; or the stock D may be removed with the mold-boards or plows E, and those (or either of them) represented at Figs. 4, 5, and 6 attached to the same handles, beam, and brace, the key or bolt $d$ fitting into the holes $m$ therein, and they being provided with studs or projections $n$, that pass into the space between the handles. I thus make a cheap, strong plow-stock that admits of almost any and every kind of mold-board or plow used by farmers to be applied to it.

Having thus fully described the nature and construction of my plow, what I claim therein as new, and desire to secure by Letters Patent, is—

The arrangement of the handles, beam, and brace and their several connecting parts so as to make a plow-stock that will admit of the changes or receive the plows or mold-boards herein stated, and in the manner set forth.

MATTHEW C. McCULLERS.

Witnesses:
 JOHN J. JONES,
 A. B. STOUGHTON.